(12) United States Patent
Abrishamchian et al.

(10) Patent No.: US 7,224,543 B1
(45) Date of Patent: May 29, 2007

(54) METHOD AND APPARATUS FOR REDUCING OFF-TRACK WRITES IN DATA STORAGE DEVICES

(75) Inventors: Mirmehdi L. Abrishamchian, Shrewsbury, MA (US); Orhan Beker, Shrewsbury, MA (US); Kevin Blankespoor, Framingham, MA (US)

(73) Assignee: Maxtor Corporation, Scotts Valley, CA (US)

( * ) Notice: Subject to any disclaimer, the term of this patent is extended or adjusted under 35 U.S.C. 154(b) by 155 days.

(21) Appl. No.: 10/861,101

(22) Filed: Jun. 4, 2004

Related U.S. Application Data

(60) Provisional application No. 60/476,128, filed on Jun. 5, 2003.

(51) Int. Cl.
*G11B 15/04* (2006.01)
(52) U.S. Cl. ...................................... 360/60
(58) Field of Classification Search ...................... None
See application file for complete search history.

(56) References Cited

U.S. PATENT DOCUMENTS 6,337,777 B1 * 1/2002 Matsubara et al. ............ 360/60
6,429,990 B2 * 8/2002 Serrano et al. ............... 360/60
6,545,838 B1 * 4/2003 Burton ..................... 360/78.06
6,556,369 B1 * 4/2003 Kanamaru et al. ............ 360/48

* cited by examiner

*Primary Examiner*—Wayne Young
*Assistant Examiner*—Glenda P. Rodriguez
(74) *Attorney, Agent, or Firm*—Tejpal S. Hansra

(57) ABSTRACT

The present invention is directed to a method and apparatus for reducing off-track writes in a data storage device. In one embodiment, a command is received to perform a write operation using a write head at a first location on a disk surface. A determination is made as to whether to perform or inhibit the write operation using an equation having a tunable acceleration coefficient. The equation is used to predict a position error signal (PES) value for a write head at a servo sector that immediately circumferentially follows the first location (i.e., there are no intervening servo sectors between the servo sector and the first location). If the predicted PES value is outside of (e.g., greater than or less than) a predetermined threshold, an off-track write is likely to occur and the write operation is inhibited.

35 Claims, 7 Drawing Sheets

METHOD AND APPARATUS FOR REDUCING OFF-TRACK WRITES IN DATA STORAGE DEVICES

CROSS-REFERENCE TO RELATED APPLICATIONS

Priority is claimed from U.S. Provisional Patent Application Ser. No. 60/476,128 filed Jun. 5, 2003, which is incorporated herein by reference in its entirety.

FIELD OF THE INVENTION

The present invention relates generally to data storage devices, such as disk drives. More particularly, the present invention relates to a method and apparatus for reducing or preventing occurrences of off-track writes in data storage devices.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16.

The disk drive 10 also includes an actuator arm assembly 18, which includes a transducer 20 (wherein the transducer has both a write head and a read head) mounted to a flexure arm 22. The actuator arm assembly 18 is attached to an actuator arm 24 that can rotate about a bearing assembly 26. A voice coil motor 28 cooperates with the actuator arm 24 and, hence, the actuator arm assembly 18, to move the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. The port 34 is also used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a disk drive 10, for example, data is stored in the form of magnetic polarity transitions within each track. Data is "read" from the disk 12 by positioning the transducer 20 (i.e., the transducer's read head) above a desired track of the disk 12 and sensing the magnetic polarity transitions stored within the track, as the track moves below the transducer 20. Similarly, data is "written" to the disk 12 by positioning the transducer 20 (i.e., the transducer's write head) above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$ in response to, among other things, an access command received from the host computer 33 via the interface 40.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 32 into a write current signal that is delivered to the transducer 20 to "write" the customer data to an appropriate portion of the disk 12. The read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 that each cross all of the tracks 42 on the disk 12. The servo information in the servo spokes 44 (also known as servo sectors) is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 have traditionally been used to store customer data received from, for example, the host computer 33 and are thus referred to herein as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During operation, disk drives may be subjected to disturbances such as shocks and vibrations. Shocks may generally be due to external forces, while vibrations may generally be due to both external and internal forces. For example, a shock can occur when someone or something bumps the disk drive (or the housing containing the disk drive). External vibrations may be due to, for example, an attached cooling fan or nearby disk drives performing seek operations. Internal vibrations may be due to seek operations and/or movement of other components within the disk drive.

Because the transducer's position is only corrected when a servo sector is encountered, there is a risk that shocks and vibrations can cause off-track writes. That is, shocks and vibrations can cause data to be written: (1) at improper locations such that data in nearby tracks (usually adjacent tracks) is overwritten; or, (2) so far away from the data's intended location that it cannot be properly read (i.e., it is irrecoverable).

One prior method of reducing off-track writes uses a shock sensor comprising an accelerometer that is mounted on the printed circuit board 32. However, using an accelerometer has a number of disadvantages (only some of which are mentioned herein).

Specifically, an accelerometer, since it is an off-the-shelf component, adds cost to the disk drive 10. Accordingly, it would be beneficial to develop a method and apparatus for reducing off-track writes which does not require any additional components, such as an accelerometer.

It should be understood that disk drives are expected to withstand a certain level of shock or vibration without writing off-track. "Safe shocks" are shocks which would not result in an off-track write, while "unsafe" shocks are shocks which would result in an off-track write. Similarly, "safe vibrations" are vibrations which would not result in an off-track write, and "unsafe vibrations" are vibrations which would result in an off-track write.

When a shock or vibration occurs, an accelerometer outputs an analog signal which (after filtering) is compared to a predetermined threshold. If the threshold is exceeded (or, in another case, not met), an off-track event is likely to occur and any write operations are prohibited, generally, for one revolution. Next, the output of the accelerometer is again compared to the predetermined threshold. If the output of the accelerometer is less than (or, in another case, greater than) the predetermined threshold, the write operation is allowed to be performed.

Determination or "tuning" of the predetermined threshold is performed using an iterative technique. Because it is extremely time-consuming to determine individual predetermined thresholds for each drive, a predetermined threshold is determined for a group of drives (generally, on a product-line by product-line basis).

A "false trigger" can occur when the disk drive believes that a "safe shock" or "safe vibration" is an "unsafe shock" or "unsafe vibration." For example, in the case of an accelerometer, a false trigger can occur when the output of the accelerometer is greater than the predetermined threshold, but an off-track write would not actually occur due to the shock or vibration that is being measured by the accelerometer. Because false triggers can reduce a disk drive's performance (due to, for example, write operations being prohibited for one revolution), it is important that false triggers are kept to a low level.

Accelerometers can cause an undesirable number of false triggers due to output variations between individual accelerometers. That is, a first accelerometer mounted to a printed circuit board that is subjected to a shock may output a signal that is different from the signal output by a second accelerometer (of the same brand, type and model as the first accelerometer) mounted identically to the printed circuit board when subjected to the same shock. This makes tuning of the predetermined threshold extremely difficult and, therefore, can cause a large number of false triggers, thereby negatively impacting drive performance. Accordingly, it would be desirable to develop a method and apparatus for reducing off-track writes which does not cause a large number of false triggers.

In order to ensure that disk drives are capable of properly handling shocks and vibrations, disk drives are subjected to a battery of qualification tests. If a drive fails to meet the shock and vibration qualification tests, the drive may be scrapped or a line of disk drives may be required to be redesigned, thereby increasing manufacturing costs and/or reducing manufacturing throughput. Accordingly, it would be desirable to design a method and apparatus for reducing off-track writes, which meets shock and vibration qualification tests more effectively than prior techniques.

SUMMARY OF THE INVENTION

The present invention is designed to meet some or all of the aforementioned, and other, needs.

A method and apparatus for reducing off-track writes in a data storage device is disclosed. In one embodiment, a command is received to perform a write operation using a write head at a first location on a disk surface. A determination is made as to whether to perform or inhibit the write operation using an equation having a tunable acceleration coefficient. The equation is used to predict a position error signal (PES) value for a write head at a servo sector that immediately circumferentially follows the first location. If the predicted PES value is outside of (e.g., greater than or less than) a predetermined threshold, an off-track write is likely to occur and the write operation is inhibited.

In one embodiment, when the predicted PES value is outside of the predetermined threshold, write operations are inhibited for at least one servo sector. In another embodiment, when the predicted PES value is outside of the predetermined threshold, write operations are inhibited for at least one revolution.

In one embodiment, the PES value is predicted for the write head using two equations. In the first equation, a first tunable acceleration coefficient is provided, wherein said first tunable acceleration coefficient has a positive value. In addition, a first threshold is associated with the first equation. In the second equation, a second tunable acceleration coefficient is provided, wherein said second tunable acceleration coefficient has a negative value. In addition, a second threshold is associated with the second equation. If the PES value predicted by the first equation is outside of the first threshold or if the PES value predicted by the second equation is outside of the second threshold, then an off-track write is likely to occur and write operations are inhibited.

By using a PES based safe-write algorithm, off-track writes are reduced. Furthermore, the need for providing an accelerometer to be used as a shock or vibration sensor is eliminated, thereby reducing the costs associated therewith.

Other embodiments, objects, features and advantages of the invention will be apparent from the following specification taken in conjunction with the following drawings.

DETAILED DESCRIPTION OF THE PREFERRED EMBODIMENT

Figure 1:
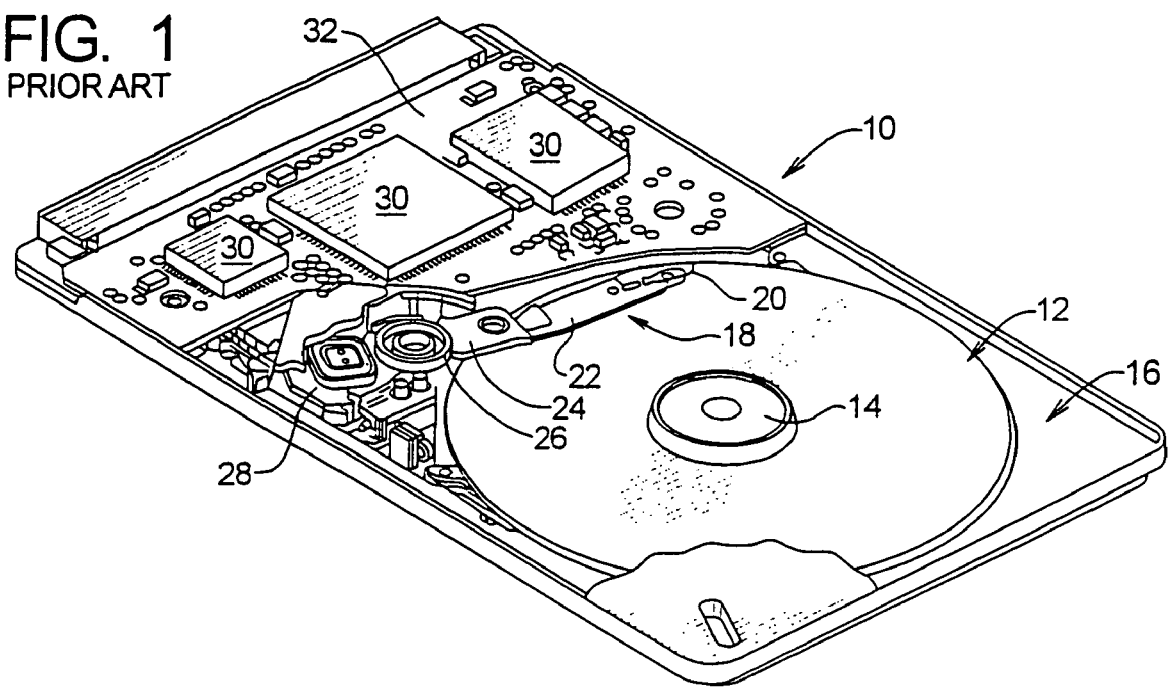
FIG. 1 is a diagrammatic representation illustrating a conventional disk drive with its top cover removed.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a method and apparatus for reducing off-track writes in a data storage device, such as a disk drive. An overview of one embodiment of the present invention is shown in FIG. 4.

Figure 4:
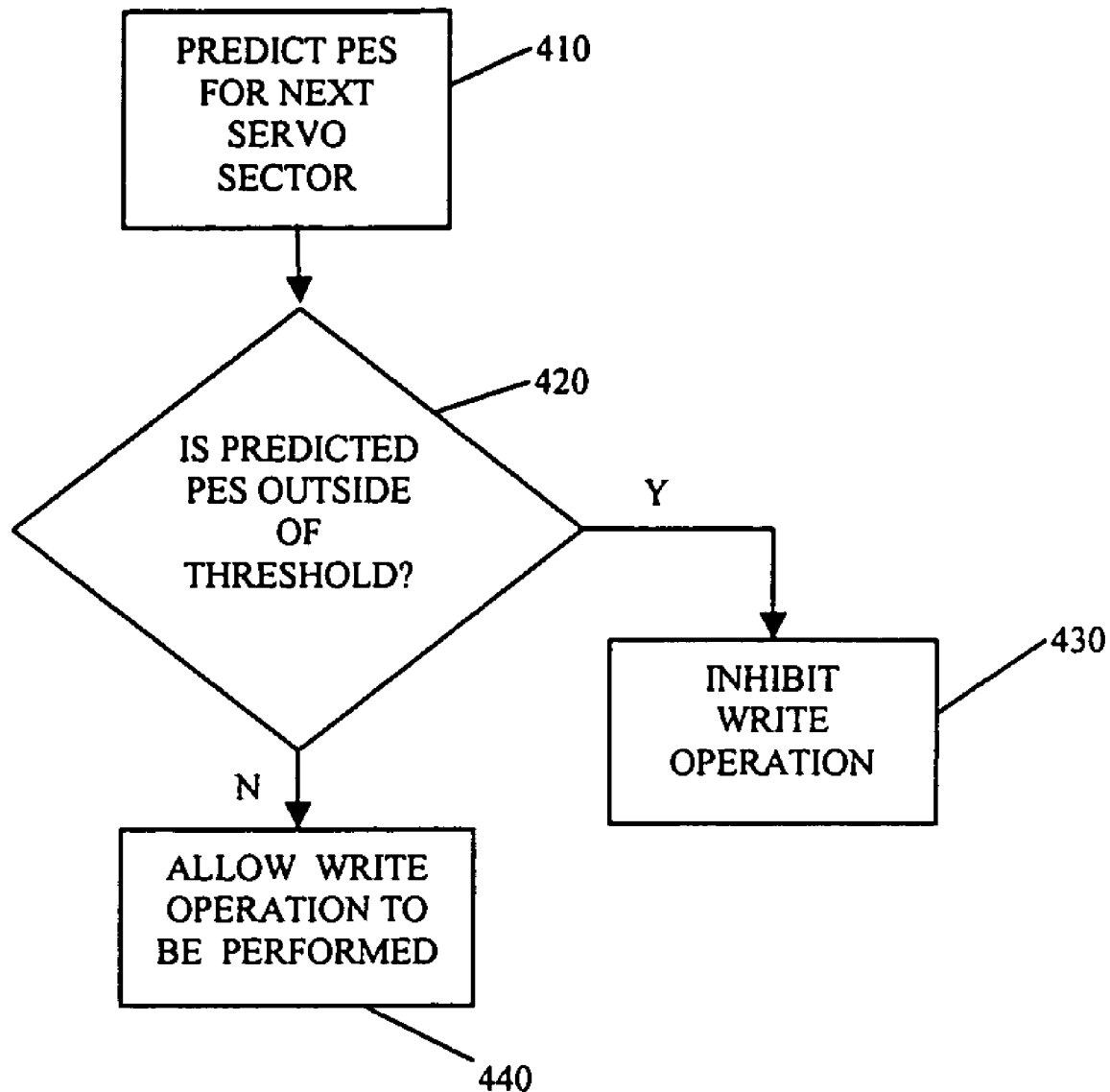
FIG. 4 is a flowchart which provides an overview of one embodiment of the present invention.

As shown in FIG. 4, a prediction is made of a PES value associated with a transducer position at a next servo sector 410. A determination is made as to whether the predicted PES value is greater than (or, in other embodiments, is less than) a predetermined threshold 420. If the predicted PES value is greater than the predetermined threshold, an off-track write is likely to occur and, therefore, write operations are inhibited 430. If, on the other hand, the predicted PES value is less than the predetermined threshold, the write operation is allowed to be performed 440. Techniques associated with both predicting the PES value associated with the next servo sector and the predetermined thresholds are discussed below.

One method of predicting the PES value associated with the next servo sector is to estimate it using the first three terms of the Taylor expansion. A second order expansion of any function is given by:

$$f(k+1) = f(k) + f'(k)[(k+1)-k] + \frac{1}{2}f''(k)[(k+1)-k]^2$$

$$= f(k) + f'(k) + \frac{1}{2}f''(k).$$

where f'(k) and f''(k) denote the first and second derivatives, respectively.

Since we are interested in predicting the PES value, i.e. p(k), we set p(k)=f(k). Next, since the PES is a discrete time signal, we use the following approximations for its first two derivatives:

$$f'(k) \approx p(k) - p(k-1)$$

and $$f''(k) \approx f'(k) - f'(k-1)$$
$$\approx p(k) - 2p(k-1) + p(k-2).$$

These approximations result in the following estimation equation for the predicted PES:

$$\hat{p}(k+1) \approx p(k) + [p(k) - p(k-1)] + \frac{1}{2}[p(k) - 2p(k-1) + p(k-2)]$$

$$= \frac{5}{2}p(k) - 2p(k-1) + \frac{1}{2}p(k-2).$$

Figure 2:
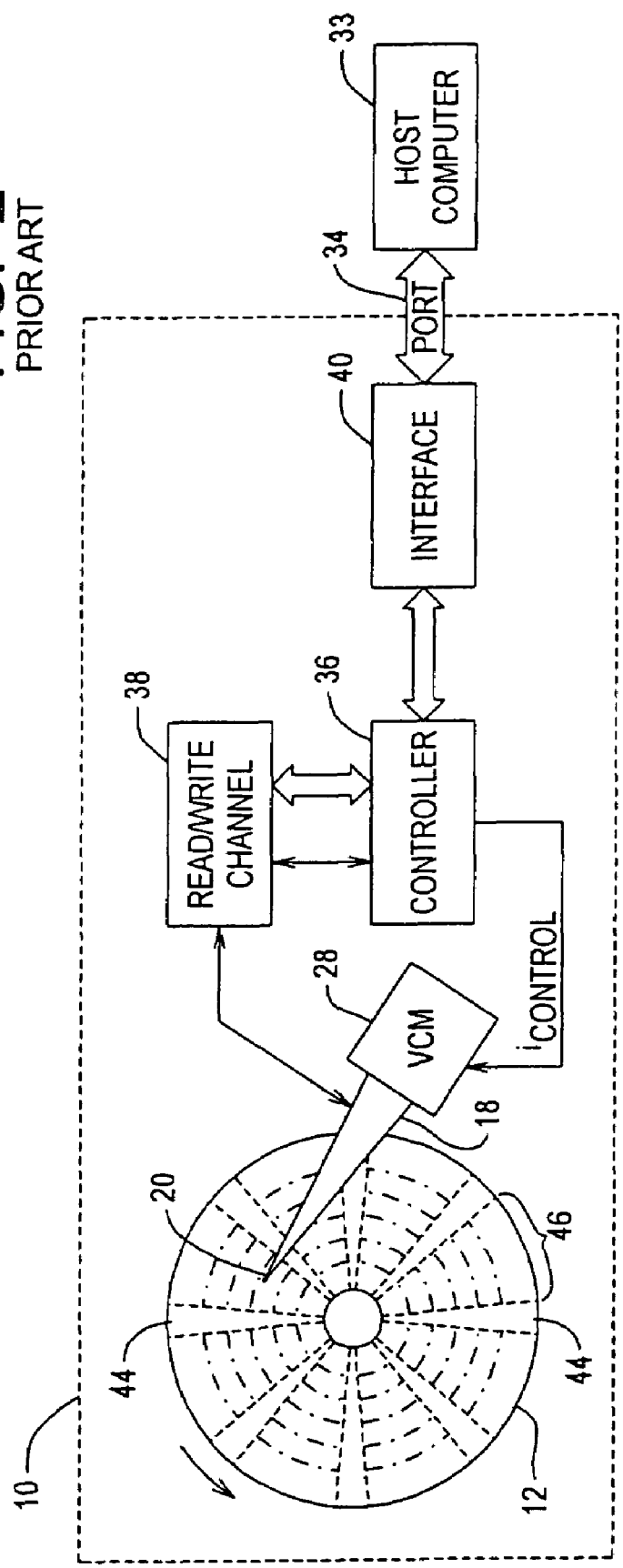
FIG. 2 is a functional block diagram which illustrates a conventional disk drive that is coupled to a host computer via an input/output port.
Figure 3:
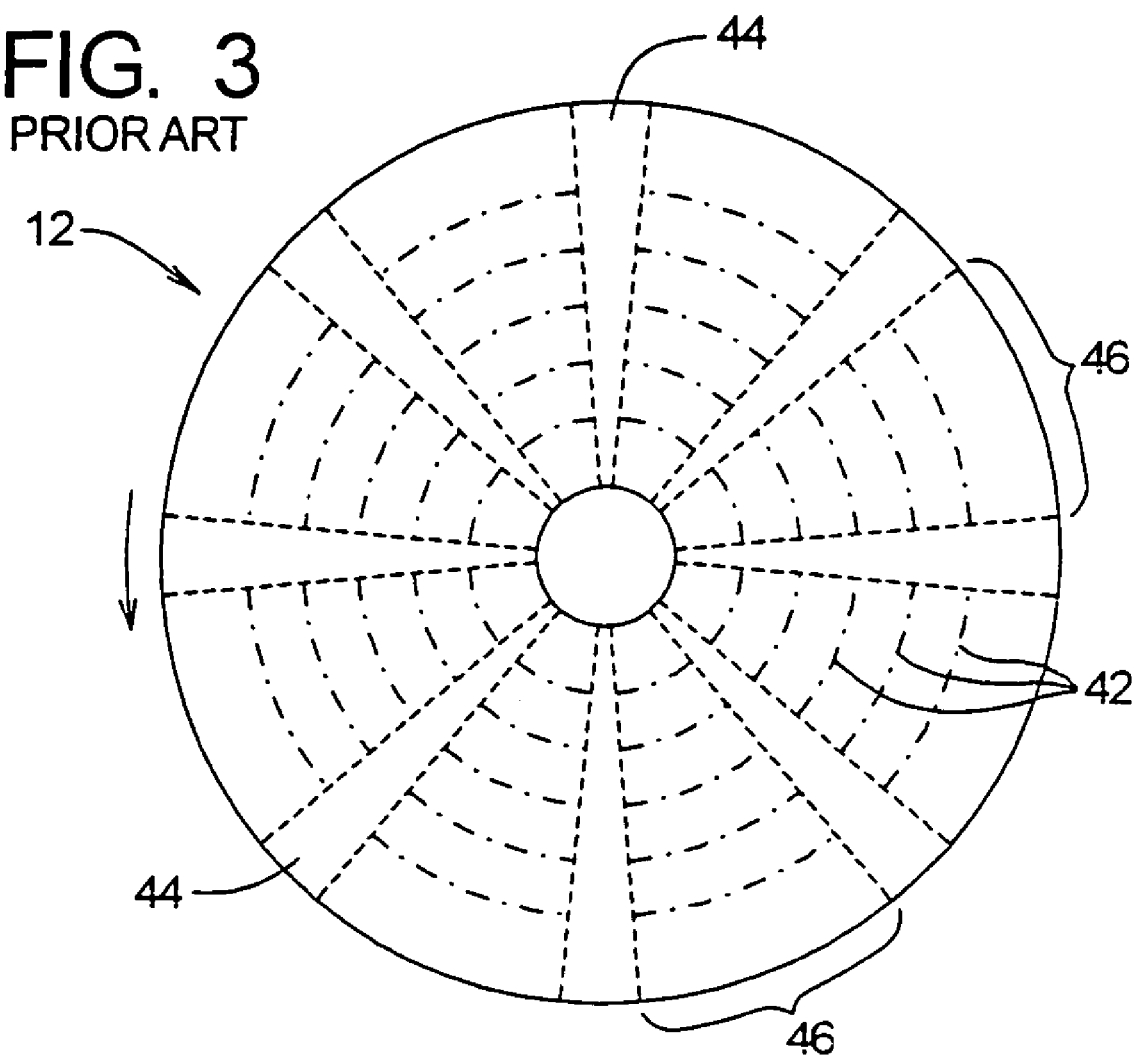
FIG. 3 is a diagrammatic representation of a top view of a magnetic storage disk illustrating a typical organization of data on a disk surface.

The above equations use crude approximations of velocity and, more importantly, of acceleration. Specifically, a constant acceleration is assumed. The inventors have determined that the above equations will provide an inaccurate estimation of the PES value associated with the next servo sector. This is because the equations fail to account for the tracking controller 36 (see FIG. 2) which attempts to minimize the PES whenever it is nonzero. Accordingly, the above-described estimation is also affected by a force that acts to correct the position error. Therefore, the assumption of a constant acceleration is a poor assumption.

In order to provide a better estimation of the PES value associated with the next servo sector, a tunable acceleration coefficient, β, is introduced such that:

$$\hat{p}_\beta(k+1) = p(k) + v(k) + \beta a(k) \quad \text{(Equation 1)}$$

$$\approx p(k) + v(k) + \beta[v(k) - v(k-1)]$$

$$\approx p(k) + [p(k) - p(k-1)] +$$

$$\beta[p(k) - 2p(k-1) + p(k-2)]$$

$$= (2+\beta)p(k) - (1+2\beta)p(k-1) + \beta p(k-2),$$

where p(k) denotes the measured PES of the actuator, v(k) the velocity and a(k) the acceleration. The coefficient β is a tunable weight on the acceleration, while $\hat{p}_\beta(k+1)$ is the predicted position (i.e., based upon a predicted PES value) at the next servo sector. The subscript denotes the dependence of the predicted PES on the selection of β.

The inventors have determined that the value of the predicted PES at the next servo sector is dependent upon whether the PES was consistently increasing (or decreasing) over the last few (e.g., three) servo sectors (defined as a "consistent acceleration" situation) or whether the PES was not consistently increasing (or decreasing) over the last few (e.g., three) servo sectors (defined as an "inconsistent acceleration" situation). In a consistent acceleration situation, when the tunable weight β is set to a positive number, the predicted PES at the next servo sector will yield a greater absolute value than if the tunable weight β was set to a negative number. Similarly, in an inconsistent acceleration situation, when the tunable weight β is set to a negative number, the predicted PES at the next servo sector will yield a greater absolute value than if the tunable weight β was set to a positive number.

In view of the above, the following two equations are provided for the "consistent acceleration" (CA) situation and the "inconsistent acceleration" (IA) situation, respectively:

$$\hat{p}_{CA}(k+1) = (2+\beta_{CA})p(k) - (1+2\beta_{CA})p(k-1) + \beta_{CA}p(k-2)$$
where $\beta_{CA} > 0$ $$\hat{p}_{IA}(k+1) = (2+\beta_{IA})p(k) - (1+2\beta_{IA})p(k-1) + \beta_{IA}p(k-2)$$
where $\beta_{IA} > 0$ The values of $\beta_{CA}$ and $\beta_{IA}$ are selected for a group of disk drives (e.g., a product line of disk drives) based upon data collected from a sample of such group of disk drives. More specifically, the values of $\beta_{CA}$ and $\beta_{IA}$ are selected based upon data collected from the drives under prescribed conditions of shock, vibration and seek, as well as quiescent TMR. Although value of $\beta_{CA}$ is positive and the value of $\beta_{IA}$ is negative, their absolute values do not have to be equal to one another (e.g., $\beta_{CA}$ may be set to 0.2, while $\beta_{IA}$ may be set to −0.5). In one embodiment, $0<\beta_{CA}<1$ and $-1<\beta_{IA}<0$.

It should be noted that the value of the PES at the next servo sector can also be predicted using a relatively simple position plus velocity predictor (P+V Predictor). Unfortunately, the PES predicted by the P+V predictor is relatively crude, unless the acceleration is zero. The predicted values of the PES using the consistent acceleration method and the inconsistent acceleration method provide results such that one of the values is greater than the value predicted by a conventional P+V predictor and one of the values is less than the value predicted by a conventional P+V predictor (except, of course, when the acceleration is zero where all three predictions will be the same). Subject to the narrow exception where the acceleration is zero, one of the two predicted PES values will be more conservative than the PES value predicted by a conventional P+V predictor.

Figure 5:
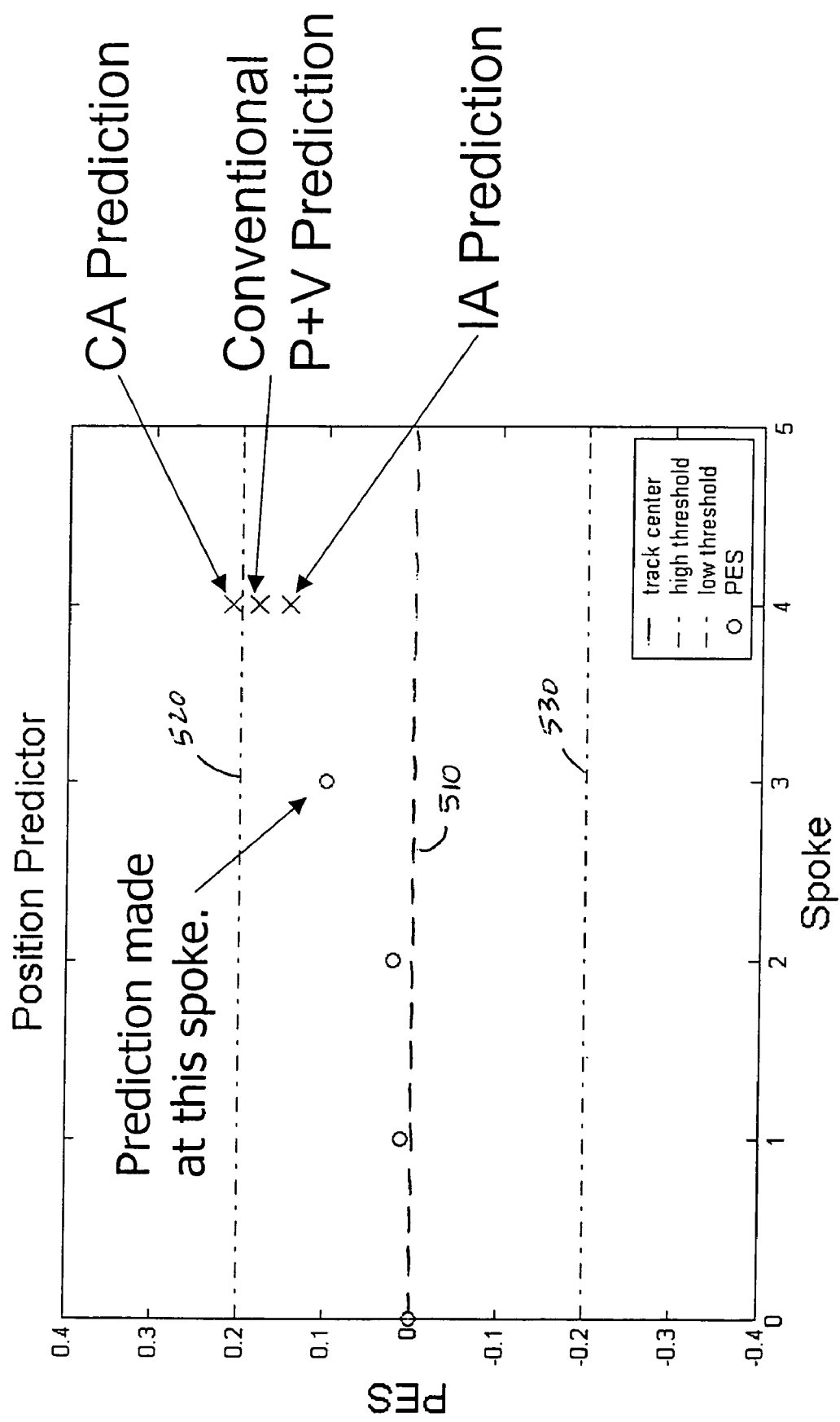
FIG. 5 illustrates exemplary predicted PES values using three techniques during a consistent acceleration situation.

FIG. 5 illustrates an example of predicted PES values using the consistent acceleration method, the P+V method and the inconsistent acceleration method when the PES values are consistently increasing over the last few servo sectors (i.e., during a consistent acceleration situation). The y-axis indicates the value of the PES in units of tracks, while the x-axis indicates the servo sector number. The track centerline is represented by dashed line 510, while the high threshold and the low threshold are represented by dashed lines associated with reference numerals 520 and 530, respectively. Furthermore, measured PES values are represented by small circles, while predicted values of the PES (according to the various methods) are each represented by a small "x".

As illustrated in FIG. 5, the value of the PES is to be predicted for servo sector number 4 using the measured PES values for servo sector 3, servo sector 2 and servo sector 1 (see Equation 1, above). Because the PES is consistently increasing (i.e., the value of the PES for spoke 2 is greater than the value of the PES for spoke 1, and the value of the PES for spoke 3 is greater than the value of the PES for spoke 2), the prediction of the value of the PES using the consistent acceleration method should be greater both the value of the PES predicted using the P+V method and the PES predicted using the inconsistent acceleration method. This is shown in FIG. 5.

FIG. 5 also shows that, using the consistent acceleration method, the predicted PES for servo sector 4 is greater than the high threshold 520 and, therefore, an off-track write is likely to occur. Accordingly, write operations are inhibited.

On the other hand, the predicted values of the PES for servo sector 4 using both the P+V method and the inconsistent acceleration method are less than the high threshold. Accordingly, had such methods been used to predict the value of the PES for servo sector 4, write operations would still have been permitted, which might have led to an off-track write.

Figure 6:
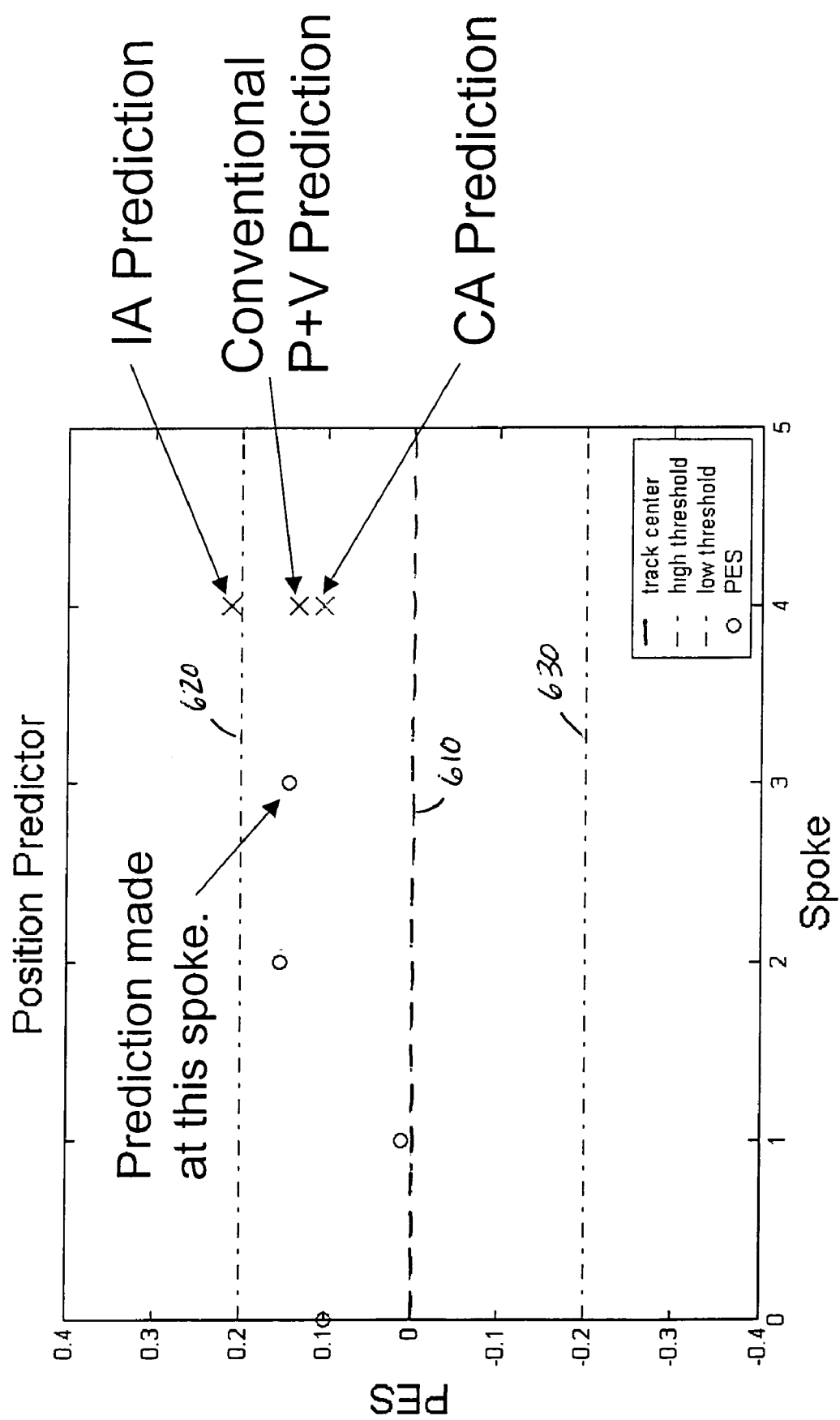
FIG. 6 illustrates exemplary predicted PES values using three techniques during an inconsistent acceleration situation; and, FIG. 7 is flowchart illustrating one embodiment of the present invention.

FIG. 6 illustrates an example of predicted PES values using the inconsistent acceleration method, the P+V method and the consistent acceleration method when the PES values are not consistently increasing or decreasing over the last few servo sectors (i.e., during an inconsistent acceleration situation). The y-axis indicates the value of the PES in units of tracks, while the x-axis indicates the servo sector number. The track centerline is represented by dashed line 610, while the high threshold and the low threshold are represented by the dashed lines associated with reference numerals 620 and 630, respectively. Furthermore, measured PES values are represented by small circles, while predicted values of the PES (according to the various methods) are each represented by a small "x".

As illustrated in FIG. 6, the value of the PES is to be predicted for servo sector number 4 using the measured PES values for servo sector 3, servo sector 2 and servo sector 1 (see Equation 1, above). Because the PES is not consistently increasing (i.e., the value of the PES for spoke 2 is greater than the value of the PES for spoke 1, but the value of the PES for spoke 3 is less than the value of the PES for spoke 2), the prediction of the value of the PES using the inconsistent acceleration method should be greater than both the value of the PES predicted using the P+V method and the value of the PES predicted using the consistent acceleration method. This is shown in FIG. 6.

FIG. 6 also shows that, using the inconsistent acceleration method, the predicted PES value for servo sector 4 is greater than the high threshold 620 and, therefore, an off-track write is likely to occur. Accordingly, write operations are inhibited.

On the other hand, the predicted values of the PES for servo sector 4 using both the P+V method and the consistent acceleration method are less than the high threshold. Accordingly, had the value of the PES for servo sector 4 been predicted using such methods, write operations would still have been permitted, which might have led to an off-track write.

It should be noted that the high threshold 520 and the low threshold 530 may be equal to one another (as shown in FIG. 5) or each may be a different value. Similarly, the high threshold 620 and the low threshold 630 may also be equal to one another (as shown in FIG. 6) or each may be a different value. Furthermore, the threshold(s) associated with the consistent acceleration situation (FIG. 5) and the threshold(s) associated with the inconsistent acceleration situation (FIG. 6) may be equal to, or different from, one another.

In order to reduce the likelihood of off-track writes, writes are inhibited when the predicted PES at the next servo sector, using either the consistent acceleration method or the inconsistent acceleration method, is outside of a threshold. That is, there is a Logical OR relationship between the two methods in deciding whether to inhibit at the write at a customer data location following the next servo sector. This is summarized in the Table I (below).

TABLE I

| CA Trigger | IA Trigger | Inhibit Write |
|---|---|---|
| No | No | No |
| No | Yes | Yes |
| Yes | No | Yes |
| Yes | Yes | Yes |

In one embodiment, the write is inhibited for one revolution. In another embodiment, the write is inhibited for one at least servo sector, wherein another prediction is made with respect to the value of the PES at the next servo sector (e.g., if a write is inhibited at servo sector 4, then the next servo sector would be servo sector 5). Based upon the predicted PES at the next servo sector (e.g., servo sector 5), a write is either performed or inhibited at a data sector that follows the next servo sector (e.g., servo sector 5).

The present invention allows at least four parameters to be tuned based upon data collected from a sample of the drives under prescribed conditions of shock, vibration and seek, as well as quiescent TMR. Specifically, the parameters are $\beta_{CA}$, $\beta_{IA}$, the threshold for the consistent acceleration method (e.g., in % tracks), and the threshold for the inconsistent acceleration method (e.g., in % tracks). Additional parameters may also include high and low thresholds for both the CA method and the IA method. These parameters can be easily tuned off-line by post processing the PES data collected from a sufficient number of drives with the algorithm turned off. That is, the parameters can be tuned by studying many PES signals during certain conditions (e.g., shock events, vibrations and seeks) to characterize the drive's reactions to such conditions.

Figure 7:
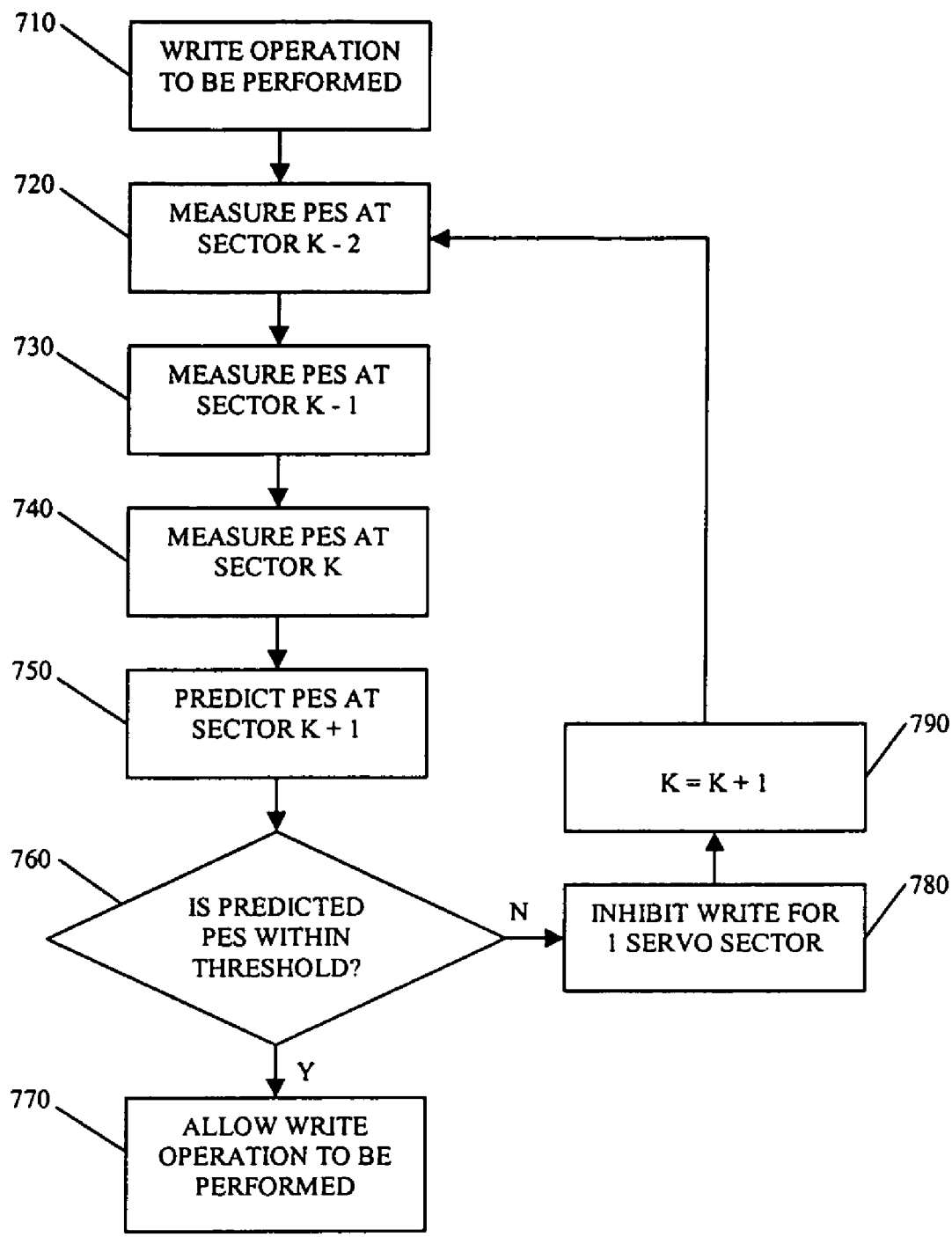

FIG. 7 is a flowchart which illustrates one embodiment of the present invention. However, prior to discussing FIG. 7, some prefatory comments are required.

A command (e.g., from the host computer) may be given to write data at a data sector using a write head. In such case, there is a servo sector that immediately circumferentially precedes the data sector (i.e., there are no intervening servo sectors between the data sector and the servo sector, although there may be intervening data sectors). That is, if the write operation is not inhibited, this servo sector will be used to position the write head immediately prior to writing the data on the disk surface. After reading this servo sector, a prediction is made of a PES value for the write head associated with the next servo sector to determine whether to allow or inhibit the write operation.

Referring now to FIG. 7, when a write operation is to be performed (step 710) to write data following sector k, PES values are measured at sector k−2, sector k−1, and sector k (steps 720-740). Next, the PES value for sector k+1 is predicted using both the consistent acceleration equation and the inconsistent acceleration equation (step 750).

Next, a determination is made as to whether both the predicted PES value for sector k+1 calculated according to the consistent acceleration equation is within its associated threshold and the predicted PES value for sector k+1 calculated according to the inconsistent acceleration equation is within its associated threshold (step 760). If so, the write is allowed to be performed at the data sector following sector k (i.e., data sectors that are encountered prior to encountering another servo sector) because an off-track write is not likely to occur (step 770).

On the other hand, if either (or both) the predicted PES for sector k+1 calculated according to the consistent acceleration equation is outside of its associated threshold or the predicted PES for sector k+1 calculated according to the inconsistent acceleration equation is outside of its associated threshold, then the write operation is inhibited (step 780). Specifically, the write operation is inhibited for at least one servo sector. Accordingly, the value of k is incremented by 1 (step 790). Then, measurements of the PES at new sector k−2, new sector k−1 and new sector k are used to predict the PES at new sector k+1 (steps 720-750). Of course, the measurements of the PES at new sector k−2 and new sector k−1 are not required to be retaken since those measurements correspond with original sector k−1 and original sector k, respectively.

As an alternative, instead of running both the equations in parallel, a determination may first be made as to whether a consistent acceleration or inconsistent acceleration exists. Then, a calculation may be made using the appropriate equation.

As mentioned above, write operations may be inhibited for one servo sector or for one revolution when the predicted PES of a servo sector (i.e., servo sector k+1) is outside of a threshold. In another embodiment, a flag is set each time write operations are inhibited due to a predicted PES being outside of a threshold. Based upon the history of the flags, (e.g., if there have been at least two instances in a row which have raised a flag), another mode may be entered where more conditions must be satisfied before write operations are permitted. For example, a tightened threshold (e.g., a tighter position and/or velocity) must be satisfied before write operations are permitted.

The present invention may also be used to test track quality (e.g., in a self-test process). In the test, track quality may be deduced by using the present invention to determine whether a track (or portion of a track) has predicted PES values that are within a threshold (wherein the threshold is relatively tighter than the threshold used during normal operations). If a track (or portion of a track) has more than a predetermined number of predicted PES values that fall outside of the threshold, the track (or portion of the track) will be considered to be a "bad" track (or "bad" portion of a track).

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for reducing off-track writes in a disk drive, said method comprising the steps of:
   receiving a command to perform a write operation to write data onto a disk surface at a first location using a write head;
   determining whether to inhibit writing of said data at said first location by predicting a position of said write head at said first location using an equation having a tunable acceleration coefficient, wherein the equation is given by:
   $\hat{p}_\beta(k+1) = (2+\beta)p(k) - (1+2\beta)p(k-1) + \beta p(k-2)$, where $\hat{p}(k+1)$ is the predicted position of the write head at servo sector k+1, p(k) is a measured position of the write head at servo sector k, p(k−1) is a measured position of the write head at servo sector k−1, p(k−2) is a measured position of the write head at servo sector k−2, and β is the tunable acceleration coefficient.

2. The method of claim 1, such that there is no intervening servo sector between servo sector k+1 and the first location on the disk surface.

3. The method of claim 1, wherein said tunable acceleration coefficient is a positive number in a consistent acceleration situation.

4. The method of claim 1, wherein said tunable acceleration coefficient is a negative number in an inconsistent acceleration situation.

5. A method for reducing off-track writes in a disk drive, said method comprising the steps of:
   receiving a command to perform a write operation to write data onto a disk surface at a first location using a write head;
   predicting a first position error signal (PES) value associated with a position of said write head at a servo sector that immediately circumferentially follows the first location using a first equation having a first tunable acceleration coefficient;

predicting a second position error signal (PES) value associated with a position of said write head at the servo sector that immediately circumferentially follows the first location using a second equation having a second tunable acceleration coefficient, wherein the first predicted PES value and the second predicted PES value are determined using measured PES values for the write head from three servo sectors which immediately precede the servo sector for which the prediction is being made.

6. The method of claim 5, wherein said first predicted PES value is associated with a consistent acceleration situation.

7. The method of claim 5, wherein said second predicted PES value is associated with an inconsistent acceleration situation.

8. The method of claim 5, wherein a write operation is inhibited for at least one servo sector when said first predicted PES value is greater than a first threshold associated with said first equation.

9. The method of claim 5, wherein a write operation is inhibited for at least one servo sector when the second predicted PES value is greater than a second threshold associated with the second equation.

10. The method of claim 5 further including the step of: determining whether to inhibit writing of said data at said first location using both said first equation and said second equation.

11. The method of claim 5, wherein a first upper threshold is provided for said first equation and a first lower threshold is provided for said first equation, and wherein a write operation is inhibited for at least one servo sector when said first predicted PES value is outside of a range between the first upper threshold and said first lower threshold.

12. The method of claim 5, wherein a second upper threshold is provided for said second equation and a second lower threshold is provided for said second equation, and wherein a write operation is inhibited for at least one servo sector when the second predicted PES value is outside of a range between said second upper threshold and said second lower threshold.

13. The method of claim 5, wherein said first and second tunable acceleration coefficients are tuned using an iterative technique.

14. The method of claim 13, wherein said iterative technique includes collecting data from a sample of a group of disk drives under prescribed conditions of shock and vibration.

15. A method for reducing off-track writes in a disk drive, said method comprising the steps of:
providing a disk surface and a write head associated with said disk surface;
determining whether to write to a first location on said disk surface by predicting a position error signal (PES) value for said write head at a servo sector that circumferentially follows said first location using a first tunable acceleration coefficient and a second tunable acceleration coefficient,
wherein the predicted PES value is determined using measured PES values for said write head from three servo sectors which immediately precede the servo sector for which the prediction is being made.

16. The method of claim 15, wherein said determination as to whether to write to said first location is made using a first threshold associated with said first tunable acceleration coefficient and a second threshold associated with said second tunable acceleration coefficient.

17. The method of claim 16 further comprising the step of: setting a flag each time a write operation is inhibited.

18. The method of claim 17 further including the step of: using a history of flag settings to determine whether to adjust the first threshold and the second threshold.

19. A method for reducing off-track writes in a disk drive, said method comprising the steps of:
providing a disk surface and a write head associated with said disk surface;
determining whether to write to a first location on a disk surface by predicting a position error signal (PES) value for said write head at a servo sector that circumferentially follows said first location using at least two tunable parameters,
wherein the predicted PES value is determined using measured PES values for said write head from three servo sectors which immediately precede the servo sector for which the prediction is being made.

20. The method of claim 19, wherein the at least two tunable parameters include a first tunable acceleration coefficient and a first threshold associated with said first tunable acceleration coefficient.

21. The method of claim 19, wherein the at least two tunable parameters include a second tunable acceleration coefficient and a second threshold associated with said second tunable acceleration coefficient.

22. The method of claim 19, wherein the at least two tunable parameters include a first threshold and a second threshold.

23. A method for reducing off-track writes in a disk drive, said method comprising the steps of:
receiving a command to perform a write operation using a write head at a first location on a disk surface;
predicting a position error signal (PES) value for the write head at a servo sector immediately circumferentially preceding said first location on said disk surface using the following equation: $\hat{p}_\beta(k+1)=(2+\beta)p(k)-(1+2\beta)p(k-1)+\beta p(k-2)$, where $\hat{p}(k+1)$ is the predicted position of the write head at servo sector k+1, p(k) is a measured position of the write head at servo sector k, p(k−1) is a measured position of the write head at servo sector k−1, p(k−2) is a measured position of the write head at servo sector k−2, and β is a tunable acceleration coefficient, and where servo sector k+1 immediately circumferentially follows the first location on the disk surface.

24. The method of claim 23 wherein $\beta>0$.

25. The method of claim 24 wherein $0<\beta<1$.

26. The method of claim 23 wherein $\beta<0$.

27. The method of claim 26 wherein $-1<\beta<0$.

28. The method of claim 23 wherein said write operation is temporarily inhibited if said predicted PES value is greater than a first threshold.

29. The method of claim 28 wherein said write operation is temporarily inhibited for at least one servo sector.

30. The method of claim 28 wherein said write operation is temporarily inhibited for at least one revolution.

31. An apparatus for reducing off-track writes in a disk drive, said apparatus comprising:
a disk surface having a write head associated therewith;
circuitry for receiving a write command from a host computer to write to a first location on said disk surface;

circuitry for determining whether to write at said first location based upon an equation having a tunable acceleration coefficient, wherein, during a consistent acceleration situation, said equation uses a positive value for said tunable acceleration coefficient to determine whether to write to said first location, wherein a determination is made as to whether a consistent acceleration situation exists by measuring PES values for the write head for at least three servo sectors.

32. An apparatus for reducing off-track writes in a disk drive, said apparatus comprising:

a disk surface having a write head associated therewith;

circuitry for receiving a write command from a host computer to write to a first location on said disk surface;

circuitry for determining whether to write at said first location based upon an equation having a tunable acceleration coefficient, wherein, during an inconsistent acceleration situation, said equation uses a negative value for said tunable acceleration coefficient to determine whether to write to said first location, wherein a determination is made as to whether an inconsistent acceleration situation exists by measuring PES values for the write head for at least three servo sectors.

33. A method for testing track quality in a disk drive, said method comprising the steps of:

providing a disk surface having servo sectors written thereon;

predicting position error signal (PES) values associated with said servo sectors using a first equation having a first tunable acceleration coefficient, wherein it least one predicted PES value is determined using measured PES values for three servo sectors which immediately precede the servo sector for which the prediction is being made.

34. The method of claim 33 further comprising the step of:

comparing said predicted PES values to a threshold.

35. The method of claim 34, wherein a track is identified as a bad track if a predetermined number of predicted PES values are outside of said threshold.

* * * * *